United States Patent Office 3,195,418
Patented July 20, 1965

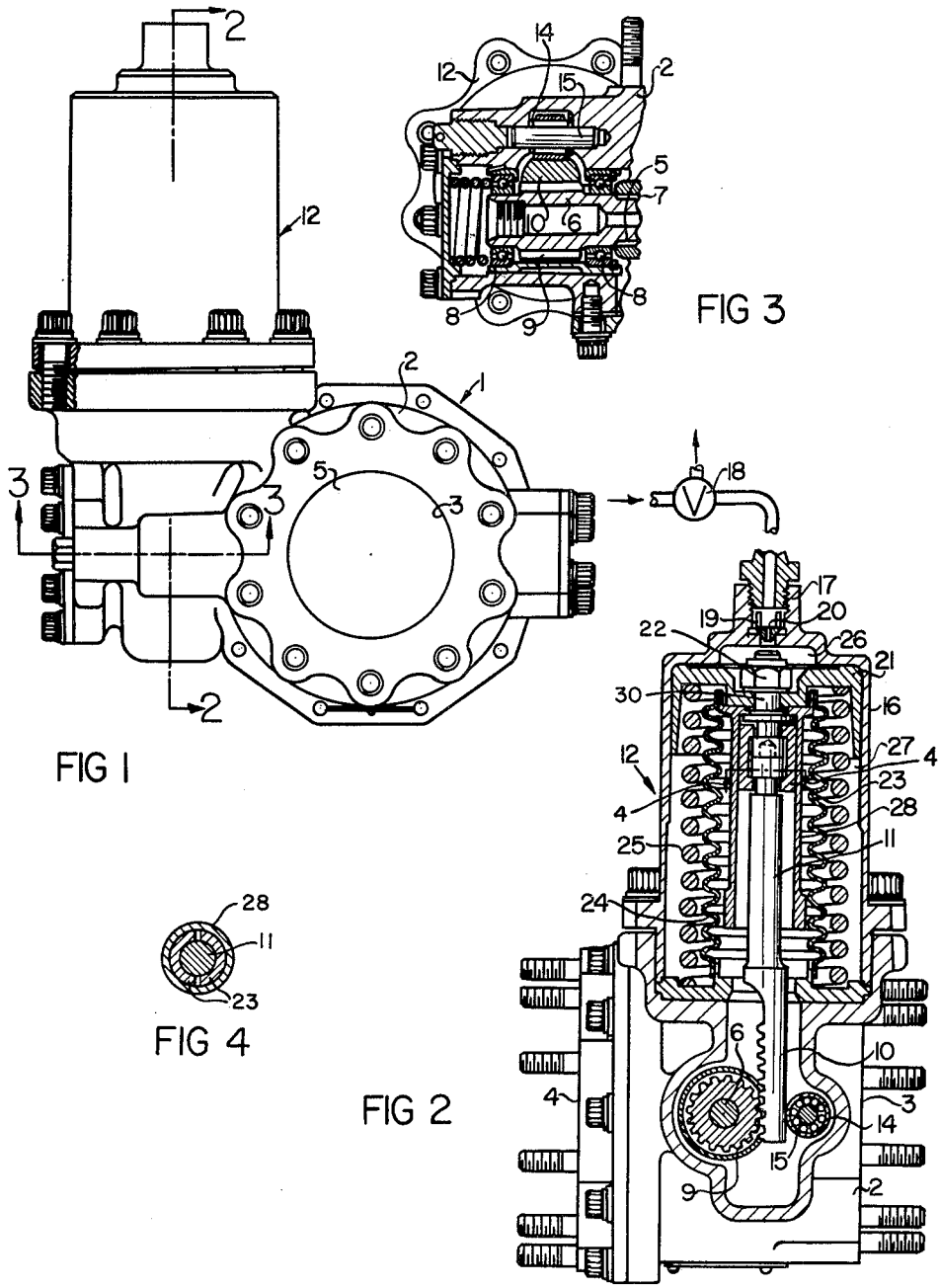

3,195,418
VALVE ACTUATING MECHANISM
Albert V. Zukas, Pacific Palisades, Calif., assignor to Parker-Hannifin Corporation, Cleveland, Ohio, a corporation of Ohio
Filed July 13, 1961, Ser. No. 123,774
6 Claims. (Cl. 91—416)

The present invention relates generally as indicated to a valve actuating mechanism and more particularly to a cryogenic valve and actuating mechanism therefor.

In certain valve applications such as oxidizer shut offs, wherein the valve is used for conducting liquid oxygen, for example, at temperatures from 165° R. to 177° R. it is required to employ a fluid valve actuating medium such as helium gas, at temperatures from minus 320° F. to plus 160° F. Also, in such application the valve itself must be opened quickly even at very low temperatures, for example, 20 to 40 milliseconds at minus 320° F.

Accordingly, it is a principal object of this invention to provide a fluid pressure operated valve actuating mechanism which is capable of meeting the above-referred to rigid specifications with reference to temperature and quickness of opening the valve.

It is another object of this invention to provide a simple and foolproof valve actuating mechanism which insures quick opening of the valve and, similarly, quick closing of the valve.

It is yet another object of this invention to provide a simplified form of valve actuating mechanism which is fluid pressure operated and which requires but a simple control valve to alternately supply fluid under pressure into the valve actuating mechanism and to vent the valve actuating mechanism to effect actuation of the valve in opposite directions.

It is another object of this invention to provide a fluid pressure actuated mechanism which is packless to thus eliminate sliding seals.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

In said annexed drawings:

FIG. 1 is a side elevation view of a rotary plug-type valve having embodied therewith the valve actuating mechanism constituting the present invention;

FIG. 2 is a cross-section view through the valve actuating mechanism taken substantially along the lines 2—2, FIG. 1;

FIG. 3 is a detail cross-section view taken substantially along the line 3—3, FIG. 1, showing a portion of the plug valve stem; and FIG. 4 is a detail cross-section view taken substantially along the line 4—4, FIG. 2.

Referring now more particularly to the drawings, although the shut-off valve 1 herein shown is a rotary plug valve comprising a valve body 2 having aligned ports 3 and 4 which are alternately in fluid communication and closed by 90° rotation of the apertured plug 5 therein, it is to be understood that the present invention may be used with any type of shut-off valve 1 whether the valve member is oscillated, reciprocated, or otherwise moved between open and closed positions.

In the present case, the valve stem 6 is splined to the plug 5 as at 7 and is supported for rotation in opposite directions by the antifriction bearings 8, 8 in the valve body 2. Between the bearings 8, 8 the valve stem 6 is formed with a pinion gear 9 which meshes with the reciprocable rack portion 10 of the shaft 11 of the valve actuating mechanism 12, the rack portion 10 being backed up and supported by an antifriction bearing 14 mounted on the shaft 15 which is parallel to the valve stem 6. It can be seen from FIG. 2, that when the rack portion 10 moves downwardly, the valve stem 6 will be turned in a clockwise direction to open the valve 1 and when the rack portion 10 moves upwardly from the downwardly shifted position, the valve stem 6 is turned back in a counterclockwise direction to close the valve 1.

The valve actuating mechanism 12 comprises a cylinder 16 which is bolted to the valve body 2 and at its upper end is provided with a port 17 for admission and venting of actuating fluid such as helium gas. Connected to the port 17 is a suitable control valve 18 for selectively conducting such actuating fluid to the cylinder 16 or for venting the cylinder 16. In the cylinder port 17 is a check valve 19 which has an orifice 20 for relatively slow admission of the actuating fluid into the cylinder 16 and which opens outwardly to permit rapid venting of the cylinder 16.

Slidably fitted in the cylinder 16, but not sealed therein, is a piston 21, which, by means of stud 30 secured thereto by nut 22 is axially fixedly secured to the valve actuating shaft 11 through a split clamp 23 (see FIGS. 2 and 4). The latter permits relative rotation between the shaft 11 and stud 30 so as to allow the teeth on rack portion 10 to align parallel with the teeth on pinion gear 9 irrespective of the rotative position of stud 30 or piston 21.

A tubular part 28 is clamped to piston 21 by stud 30 and nut 22. A collar 31 is anchored within body 2 and thus, in effect, becomes a part of the body. The lower end of tubular part 28 abuts collar 31 to stop the downward movement of piston 21.

A spring metal bellows 24 is brazed or otherwise secured at one of its ends to the uper end of tubular part 28 and at its other end to collar 31. The interior of the bellows is thus sealed from the exterior thereof. Also, compressed between the piston 21 and the collar 31 is a coil-spring 25.

When the cylinder port 17 is vented, the spring 25 and bellows 24 are effective to hold the piston 21 in the position shown in FIG. 2, the fluid pressures in the cylinder chambers 26 and 27 being equal. When it is desired to open the valve 1, the control valve 18 is operated to conduct the actuating fluid such as helium gas at a pressure of 400–500 p.s.i., for example, into the cylinder chamber 26 through the orifice 20 in the check valve 19, whereby such pressure acting on the area of the upper end of the piston 21 forces the piston 21 and the valve actuating shaft 11 downwardly against the opposing pressure force exerted by the bellows 24 and spring 25, thus to turn the valve stem 6 in a clockwise direction. The actuating fluid in the cylinder chamber 26 will leak past the piston 21 into the other cylinder chamber 27, but owing to the area of the piston 21 exposed to fluid pressure in the upper chamber 26 being greater than the area of the piston 21 exposed to pressure in the lower chamber 27, the piston 21 and valve actuating shaft 11 will be maintained in the downwardly shifted position. However, when the upper chamber 26 is rapidly vented through orifice 20 and through open check valve 19 by operation of control valve 18, the fluid under pressure in the cylinder chamber 27 acting on the annular area of the underside of the piston 21, together with the expanding forces of the spring 25 and bellows 24, will promptly shift the piston 21 upwardly together with the valve actuating shaft 11 to rapidly close the valve 1.

Other modes of applying the principle of the invention may be employed, change being made as regards the details described, provided the features stated in any of the following claims, or the equivalent of such, be employed.

I therefore, particularly point out and distinctly claim as my invention:

1. A valve actuating mechanism comprising a reciprocable valve actuating member; means defining differential area chambers with said member having restricted communication with each other; a control valve operative selectively to admit expansible fluid under pressure into larger one of such chambers to move said member in one direction and to hold said member thereat despite buildup of pressure in the smaller chamber through such restricted communication, and to vent said larger chamber whereby expansion of the fluid in the smaller chamber moves said member in the opposite direction; said means comprising a cylinder; said member comprising a packless piston in which radial clearance thereof with said cylinder provides such restricted communication; and a differential flow control device disposed to vent fluid under pressure from said larger chamber at a faster rate than when said control valve is operated to admit fluid under pressure thereinto; said device comprising an orifice check valve which is closed, except for the orfice, when fluid under pressure is admitted into said larger chamber and which is opened for rapid venting of said larger chamber.

2. A valve actuating mechanism comprising a reciprocable valve actuating member; means defining differential area chambers with said member having restricted communication with each other; a control valve operative selectively to admit expansible fluid under pressure into the larger one of such chambers to move said member in one direction and to hold said member thereat despite buildup of pressure in the smaller chamber through such restricted communication, and to vent said larger chamber whereby expansion of the fluid in the smaller chamber moves said member in the opposite direction; said means comprising a cylinder; said member comprising a packless piston in which radial clearance thereof with said cylinder provides such restricted communication and a packless piston rod extending through one end of said cylinder; and a bellows surrounding said piston rod and such one end of said cylinder thus to form the smaller chamber.

3. A valve actuating mechanism comprising a reciprocable valve actuating member; means defining differential area chambers with said member having restricted communication with each other; a control valve operative selectively to admit expansible fluid under pressure into the larger one of such chambers to move said member in one direction and to hold said member thereat despite buildup of pressure in the smaller chamber through such restricted communication, and to vent said larger chamber whereby expansion of the fluid in the smaller chamber moves said member in the opposite direction; said means comprising a cylinder; said member comprising a packless piston in which radial clearance thereof with said cylinder provides such restricted communication and a piston rod extending through one end of said cylinder and having a rotatable axially fixed connection with said piston; said rotatable connection including a part on said piston having an annular groove, an annular groove on said rod, a split clamping member engaged in both said grooves, and means for retaining said split clamping member within said grooves; said retaining means comprising a tubular member encircling said split clamping member and attached to said piston, an end of said tubular member being operative to abut said one end of said cylinder for limiting movement of said piston and rod in said one direction.

4. A valve actuating mechanism comprising a reciprocable valve actuating member; means defining differential area chambers with said member having restricted communication with each other; and a control valve operative selectively to admit expansible fluid under pressure into the larger one of such chambers to move said member in one direction and to hold said member thereat despite buildup of pressure in the smaller chamber through such restricted communication, and to vent said larger chamber whereby expansion of the fluid in the smaller chamber moves said member in the opposite direction; said means comprising a cylinder; said member comprising a piston rod and a packless piston in which radial clearance thereof with said cylinder provides such restricted communication.

5. The mechanism of claim 4 in which said piston rod has a rotatable axially fixed connection with said piston, said rotatable connection including a part on said piston having an annular groove, an annular groove on said rod, a split clamping member engaged in both said grooves, and means for retaining said split clamping member within said grooves, said means comprising a tubular member encircling said clamping member and attached to said piston.

6. The mechanism of claim 4 in which an impervious bellows means surrounds said piston rod and tubular member operative to define with said cylinder said smaller chamber.

References Cited by the Examiner

UNITED STATES PATENTS

| | | | |
|---|---|---|---|
| 990,877 | 5/11 | Hulme | 92—162 |
| 1,835,866 | 12/31 | Allan et al. | |
| 2,071,742 | 2/37 | Hancock | 92—130 |
| 2,082,940 | 6/37 | Brisbane et al. | 251—250 X |
| 2,142,190 | 1/39 | Hewitt | 121—38 |
| 2,291,243 | 7/42 | Levy | 92—162 |
| 2,343,316 | 3/44 | Newkirk | 121—38.21 |
| 2,585,408 | 2/52 | Roberson | 92—116 X |
| 2,598,271 | 5/52 | Klosterman | 92—116 X |
| 2,746,425 | 5/56 | Schafer | 121—38.21 |
| 2,909,315 | 10/59 | Sampietro | 91—35 X |
| 2,974,921 | 3/61 | Kaswan | 251—250 X |

FRED E. ENGELTHALER, *Primary Examiner.*

KARL J. ALBRECHT, *Examiner.*